US012728711B2

(12) United States Patent
Lee et al.

(10) Patent No.: US 12,728,711 B2
(45) Date of Patent: Sep. 8, 2026

(54) FOLDABLE LOADING BAY COVER FOR A VEHICLE

(71) Applicants: HYUNDAI MOTOR COMPANY, Seoul (KR); KIA CORPORATION, Seoul (KR)

(72) Inventors: Jae-Seung Lee, Hwaseong-si (KR); Hyung-Sik Choi, Seoul (KR); Gook-Hyun Jeon, Seoul (KR); Min-Su Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 288 days.

(21) Appl. No.: 18/657,499

(22) Filed: May 7, 2024

(65) Prior Publication Data

US 2025/0083505 A1 Mar. 13, 2025

(30) Foreign Application Priority Data

Sep. 13, 2023 (KR) ........................ 10-2023-0121944

(51) Int. Cl.
*B60J 7/14* (2006.01)

(52) U.S. Cl.
CPC .................................... *B60J 7/141* (2013.01)

(58) Field of Classification Search
CPC . B60J 7/141; B60J 7/041; B60J 7/0573; B60J 7/14; B60J 7/146; B60J 7/148; B60P 7/02
USPC .............. 296/100.09, 100.1, 100.08, 136.03, 296/136.05, 136.06, 219, 223, 216.08
See application file for complete search history.

(56) References Cited

U.S. PATENT DOCUMENTS

| | | | | |
|---|---|---|---|---|
| 3,986,749 A * | 10/1976 | Hull | B60J 7/024 296/100.09 |
| 4,460,030 A * | 7/1984 | Tsunemura | E06B 9/0638 160/35 |
| 5,944,378 A * | 8/1999 | Mather | B60J 7/205 296/146.14 |
| 12,403,752 B2 * | 9/2025 | Hammoud | B60J 7/141 |
| 2025/0187410 A1 * | 6/2025 | Lee | B60J 7/068 |
| 2025/0187411 A1 * | 6/2025 | Lee | B60J 7/0573 |

FOREIGN PATENT DOCUMENTS

KR 20210027558 A 3/2021

* cited by examiner

*Primary Examiner* — Roger L Pang
(74) *Attorney, Agent, or Firm* — Lempia Summerfield Katz LLC

(57) ABSTRACT

A vehicular folding-type loading bay cover includes a cover unit with a plurality of slats. Respective upper end portions of preceding and following slats and respective lower end portions thereof are alternatingly connected, and the cover unit can be folded and unfolded in a loading bay of a vehicle. A main rail is disposed in the vehicular loading bay along a direction in which the cover unit is unfolded, guides the lower end portions of the slats, and guides the upper end portions of the slats in a section where the slats are unfolded. A guide rail branches off from the main rail, is parallel with the main rail in a section where the cover unit is fully folded and guides the upper end portions of the slats when the cover unit is folded.

20 Claims, 18 Drawing Sheets

12
32
35
11
32
34
43
31
36
36
31

FOLDABLE LOADING BAY COVER FOR A VEHICLE

CROSS-REFERENCE TO RELATED APPLICATION

This application claims priority to Korean Patent Application No. 10-2023-0121944, Sep. 13, 2023, which is incorporated herein by reference in its entirety.

BACKGROUND

Field of the Disclosure

The present disclosure relates to a loading bay cover for covering a loading bay of a vehicle and, more particularly, to a loading bay cover that closes an upper surface of a loading bay without protruding into the loading space and by employing a simple structure.

Description of Related Art

In the case of a vehicle 100, such as a pick-up truck, a loading bay 110 having a predetermined size is formed in the rear portion of the vehicle 100.

A cover for protecting goods loaded onto the loading bay 110 may be provided on the loading bay 110. The cover may be provided as a roll shutter 130 to reduce a volume thereof when accommodated. When the roll shutter 130 is unrolled, an upper portion or opening of the loading bay 110 may be closed. Thus, foreign material such as dust may be prevented from being introduced into or onto the goods loaded in the loading bay 110 and the goods may be prevented from being ejected from the loading bay 110.

However, in the case of the shutter 130 as described above, a casing 140 may be installed inside the loading bay 110 in such a manner that the roll shutter 130 is accommodated therein when rolled up (refer to the portion A indicated by a dashed square in FIG. 2). The installation of the casing 140 decreases the internal storage or available loading space in the loading bay 110. A problem arises in that the size of the loading space is accordingly decreased.

In addition, a height h from a bottom surface of the loading bay 110 to the casing 140 may be decreased when compared with a portion of the loading bay 110 in which the casing 140 is not installed. As a result, a problem arises in that a mid-gate 120 provided between a passenger compartment and the loading bay 110 of the vehicle 100 has a low level of utilization. In other words, the casing 140 interferes when portions of long-sized goods are accommodated in the second row in the passenger compartment after opening the mid-gate 120. Thus, although the mid-gate 120 is open, the casing 140 hides a portion of the open space from view.

SUMMARY

An object of the present disclosure is to address the above-mentioned problems. Another object of the present disclosure may be to provide a vehicular folding-type loading bay cover capable of accommodating a plurality of slats into an upper portion of a loading bay of a vehicle in an overlapping manner, whereby respective upper end portions of preceding and following slats, relative to a given slat, and respective lower end portions thereof are alternatingly connected.

In order to accomplish the above-mentioned objects, according to an aspect of the present disclosure, a vehicular folding-type loading bay cover is provided. The loading bay cover includes: a cover unit having a plurality of slats where respective upper end portions of preceding and following slats and respective lower end portions thereof are alternatingly connected, and which can be folded and unfolded in a vehicular loading bay. The loading bay cover includes a main rail disposed in the loading bay along a direction in which the cover unit is unfolded. The main rail guides the lower end portions of the slats guides the upper end portions of the slats in a section where the slats are unfolded. The loading bay cover also includes a guide rail branching off from the main rail, disposed parallel with the main rail in a section where the cover unit is fully folded, and guiding the upper end portions of the slats when the cover unit is folded.

In the loading bay cover, the cover unit may include the plurality of slats oriented in a generally vertical direction when the cover unit is folded and oriented generally horizontal when the cover unit is unfolded. The cover unit may include a connector connecting the upper end portions of adjacent slats to each other or connecting the lower end portions of adjacent slats to each other. The cover unit may also include an upper bracket connecting the upper end portions of adjacent slats to each other, movable from the guide rail along the main rail when the cover unit is unfolded, and movable from the main rail along the guide rail when the cover unit is folded. The loading bay cover may also include a lower bracket connecting the lower end portions of adjacent slats to each other, and movable along the main rail.

In the vehicular folding-type loading bay cover, an inner slot guides one side of the lower bracket and an outer slot is positioned outward relative to the inner slot and guides one side of the upper bracket. The inner slot may be formed in the main rail. Also, a folding slot, connected to the outer slot, guides the upper bracket with the cover unit folded with the slats overlapping. The folding slot may be formed in the guide rail.

In the vehicular folding-type loading bay cover, an upper moving block may be connected to an upper guide and is movable along the outer slot and the folding slot. One of the upper moving blocks may be formed on each of the upper brackets. A lower moving block may be connected to a lower guide and movable along the inner slot. One of the lower moving blocks may be formed on each of the lower brackets.

In the vehicular folding-type loading bay cover, the upper guide may be formed to have a greater length than the lower guide.

In the vehicular folding-type loading bay cover, cover portions may cover the connectors when the cover unit is unfolded and may be formed on the upper end portion and the lower end portion, respectively, of each slat.

In the vehicular folding-type loading bay cover, the lower end portion of the slat of the cover unit, positioned close to a rear end of a vehicle, may be hinge-connected to a fixation bracket fixedly installed on the loading bay.

In the vehicular folding-type loading bay cover, the upper end portions of the innermost two slats of the cover unit may be connected to each other with a start bracket that is separated from the main rail or the guide rail.

In the vehicular folding-type loading bay cover, a cable plate may be provided at the lower end portion of the outermost slat of the cover unit. An end portion of a cable, by which the cover unit is operated in a direction in which the cover unit is folded or unfolded, is fixed to the cable plate.

In the vehicular folding-type loading bay cover, a plate slot, along which the cable plate may slide, may be formed in the main rail.

In the vehicular folding-type loading bay cover, a cable slot, in which the cable by which the cover unit is folded or unfolded is installed, may be formed in the main rail.

In the vehicular folding-type loading bay cover, the inner slot, the plate slot, and the cable slot may communicate with each other.

The vehicular folding-type loading bay cover may further include: a drive motor; a drive gear rotated by the drive motor; and a cable engaged with the drive gear. An end portion of the cover unit may be pushed or pulled with the cable when the drive gear is rotated. The cover unit may be unfolded or folded by pushing or pulling one of the plurality of slats positioned to be maximally spaced apart from the drive motor, of the cover unit.

In the vehicular folding-type loading bay cover, an outer circumferential surface of the cable may be threaded, or teeth may be formed on the outer circumferential surface thereof along a lengthwise direction thereof. Thus, the drive gear may be engaged with the threaded outer circumferential surface or the teeth.

In the vehicular folding-type loading bay cover, a pair of the cables may be provided. The cables may be connected to both ends, respectively, of the slat, positioned to be maximally spaced apart from the drive motor, of the cover unit.

In the vehicular folding-type loading bay cover, the pair of cables may be engaged with the drive gear in such a manner as to be simultaneously wound or unwound, in order to simultaneously push or pull the plurality of slats when the drive gear is rotated.

In the vehicular folding-type loading bay cover, cable plates may be connected to both ends, respectively, of the slat positioned to be maximally spaced apart from the drive motor. An end portion of the cable may be connected to each of the cable plates.

The vehicular folding-type loading bay cover may further include a housing in which the drive motor and the drive gear are installed. The housing may be fixed to a front end portion of the main rail and a cable slot in which the cable is installed may be formed in the housing.

In the vehicular folding-type loading bay cover according to the present disclosure, which has the configurations described above, the cover unit including the plurality of slats may be accommodated in the upper portion of the loading bay. As a result, space for accommodating the cover unit may not be needed in the loading or storage space of the loading bay.

Accordingly, since the space for accommodating the cover unit is not needed inside the vehicular loading bay, space in the vehicular loading bay may be fully utilized.

In addition, in a case where a mid-gate, installed between the passenger compartment and the vehicular loading bay in a manner that is capable of being opened and closed, is open, the space formed when the mid-gate is open may be fully utilized.

DESCRIPTION OF SPECIFIC EMBODIMENTS

Figure 1:
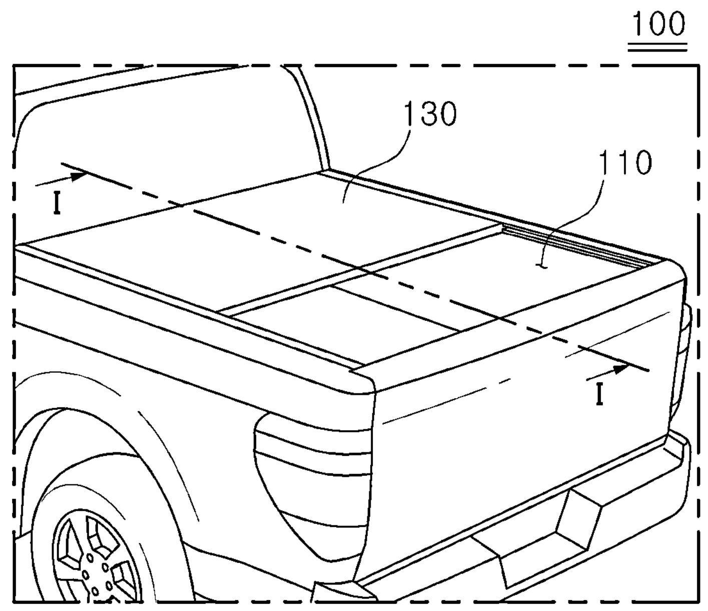
FIG. 1 is a perspective view illustrating a vehicular loading bay and cover in the related art.
Figure 2:
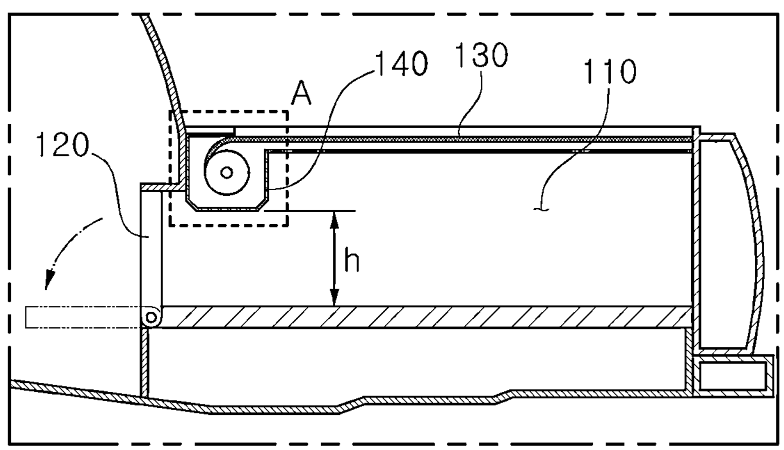
FIG. 2 is a cross-sectional view taken along line I-I of FIG. 1.
Figure 3:
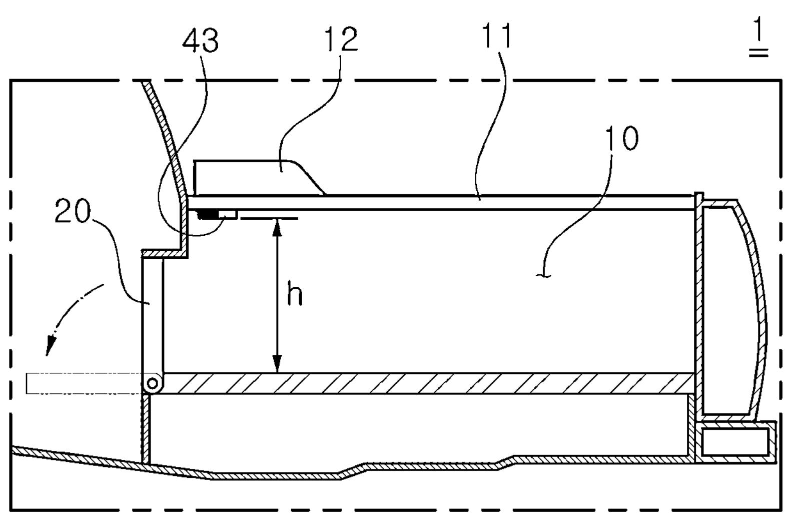
FIG. 3 is a cross-sectional view illustrating a state where a vehicular folding-type loading bay cover according to the present disclosure is installed.
Figure 4:
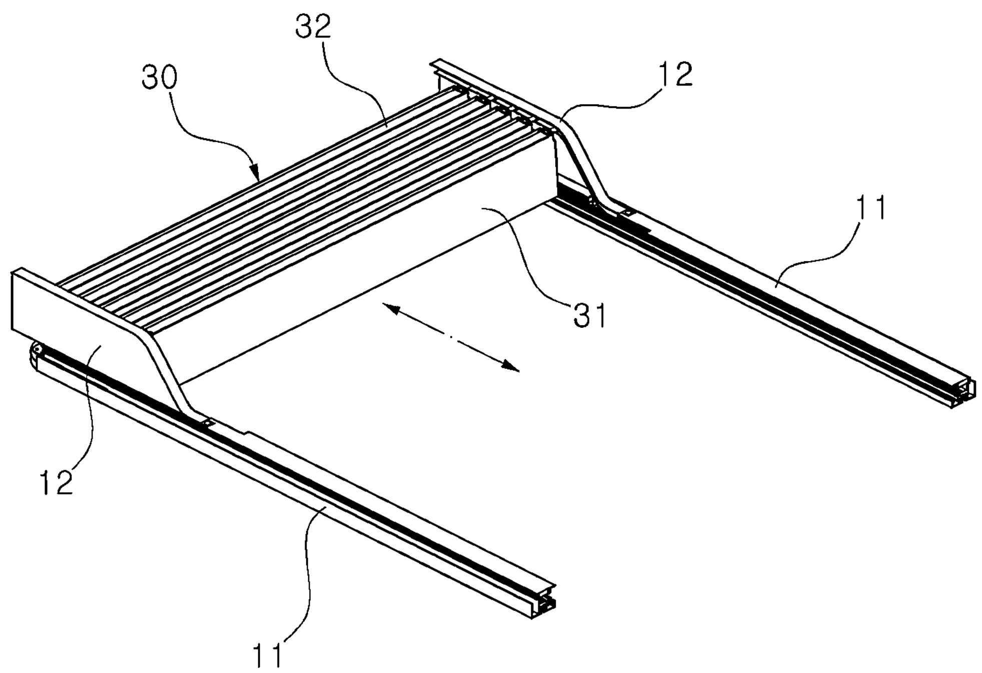
FIG. 4 is a perspective view illustrating a state where a cover unit is folded and accommodated in a vehicular folding-type loading bay cover according to the present disclosure.
Figure 5:
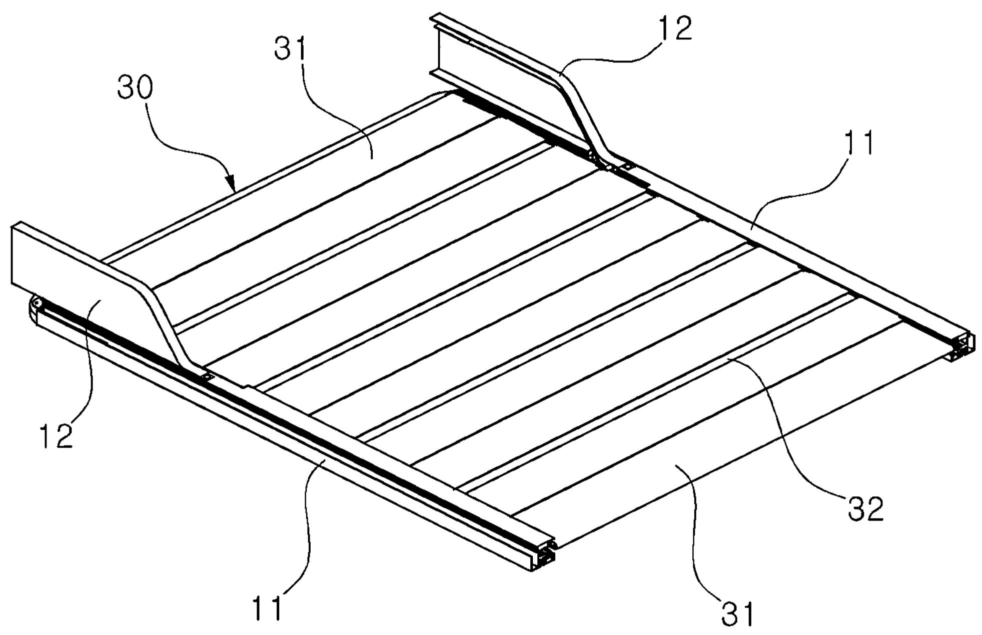
FIG. 5 is a perspective view illustrating a state where the cover unit of FIG. 4 is unfolded in a vehicular folding-type loading bay cover according to the present disclosure.
Figure 6:
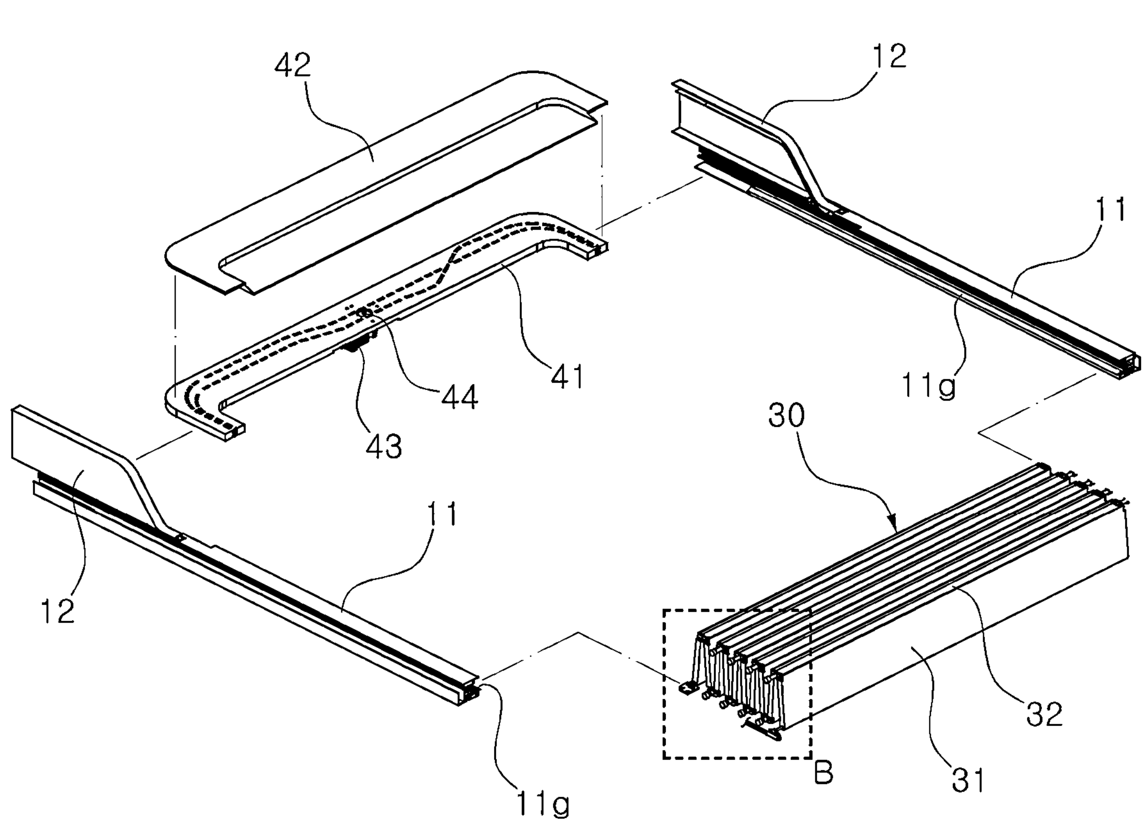
FIG. 6 is an exploded perspective view illustrating a vehicular folding-type loading bay cover according to the present disclosure.
Figure 7:
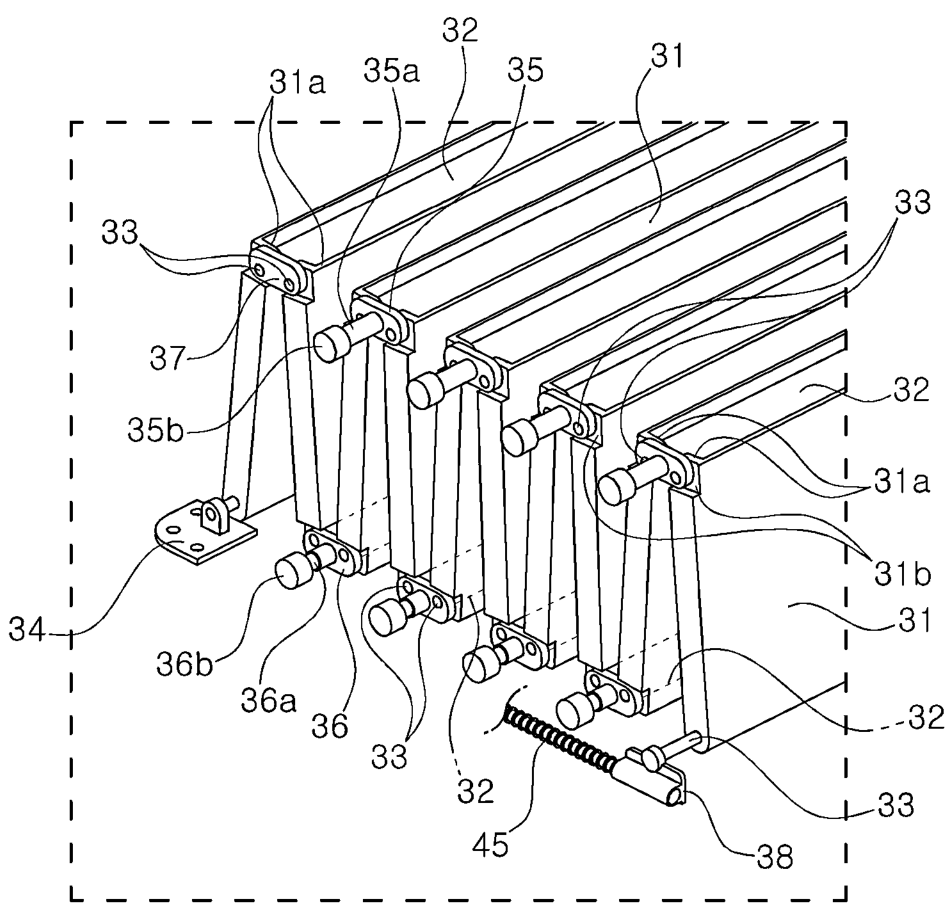
FIG. 7 is an enlarged perspective view illustrating the portion B of the loading bay cover of FIG. 6.
Figure 8:
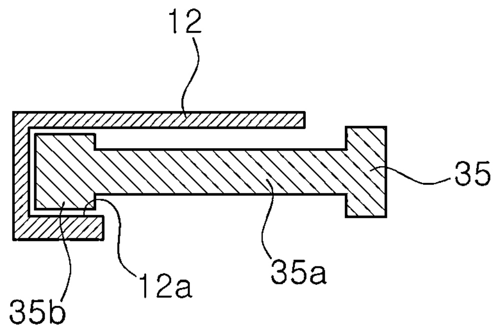
FIG. 8 is a cross-sectional view illustrating an upper bracket connected to a guide rail in a vehicular folding-type loading bay cover according to the present disclosure.
Figure 9:
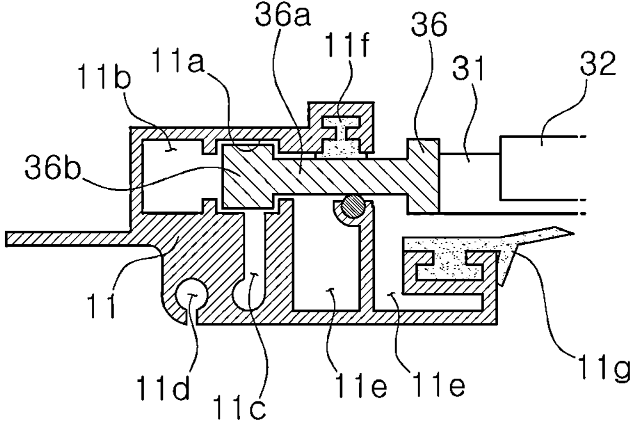
FIG. 9 is a cross-sectional view illustrating the upper bracket of FIG. 8 connected to a main rail in a vehicular folding-type loading bay cover according to the present disclosure.

A vehicular folding-type loading bay cover according to the present disclosure is described in detail below with reference to the accompanying drawings. When a component, device, element, or the like of the present disclosure is described as having a purpose or performing an operation, function, or the like, the component, device, or element should be considered herein as being “configured to” meet that purpose or perform that operation or function. As used herein for the loading bay cover, upper and lower may refer to portions of the cover when in a folded condition. These same portions may lie generally in the same plane when the cover is in an unfolded or deployed condition and thus may not be consider as upper and lower in the unfolded or deployed condition.

The vehicular folding-type loading bay cover according to the present disclosure includes a cover unit 30, a main rail 11, and a guide rail 12. The cover unit 30 includes a plurality of slats 31. Respective upper end portions of preceding and following slats 31 and respective lower end portions thereof are alternatingly connected and may be folded and unfolded in a vehicle loading bay 10. The main rail 11 may be formed, installed, or disposed in the vehicle loading bay 10 along a direction in which the cover unit 30 is unfolded. The main rail 11 may guide the lower end portions of the slats 31 and may guide the upper end portions of the slats 31 in a section where the slats are fully spread. The guide rail 12 may branch off from the main rail 11, may run in parallel with the main rail 11 in a section where the cover unit 30 is fully folded, and may guide the upper end portions of the slats 31 in such a manner that the cover unit 30 is folded.

The cover unit 30 may be folded or unfolded along one direction of a vehicle 1. Normally, in a vehicle such as a pick-up truck, the cover unit 30 may be folded or unfolded along a lengthwise direction of the vehicle. Particularly, the cover unit 30 may be folded or unfolded where a front end portion thereof is fixed to a front end portion of the loading bay 10. Since the front end portion of the cover unit 30 is fixed to the front end portion of the loading bay 10, the cover unit 30 may be folded or unfolded by moving a rear end portion of the cover unit 30 along a lengthwise direction of the vehicle 1.

The cover unit 30 may include the plurality of slats 31 and connectors 32 rotatably connecting the respective upper and lower end portions of adjacent slats 31. The connectors 32 may have a pair of through holes (not shown), into which a shaft 33 (described later) penetrates. The cover unit 30 may also include upper brackets 35 connecting upper side end portions of the adjacent slats 31 to each other. The cover unit 30 may also include lower brackets 36 connecting lower side end portions of the adjacent slats 31 to each other.

Each slat 31 may be formed in, e.g., a rectangular shape, in a widthwise direction of the vehicle 1. A plurality of the slats 31 may be arranged in a lengthwise direction of the vehicle 1. An upper end portion of one slat 31 among the plurality of the slats 31 may be hinge-connected to an upper end portion of another adjacent slat 31. Likewise, a lower end portion of the one slat 31 may be hinge-connected to a lower end portion of another adjacent slat 31. The plurality of the slats 31 are connected to each other through their upper and lower end portions via the connectors 32. Thus, when the cover unit 30 is unfolded by enabling the plurality of the slats 31 to be spread, an upper surface, portion, or opening of the loading bay 10 may be closed or covered. In addition, when the cover unit 30 is folded by enabling the plurality of the slats 31 to overlap against one another, the upper surface, portion, or opening of the vehicular loading bay 10 may be open.

Cover portions 31*a* may protrude on the upper end portion and the lower end portion, respectively, of each slat 31. When the cover unit 30 is unfolded and thus the slats 31 may be in parallel with the loading bay 10, i.e., lying generally in a plane, the cover portion 31*a* comes into contact, like a butt joint, with the cover portion 31*a* of the adjacent slat 31, thereby keeping the cover unit 30 airtight.

Connection portions 31*b* may be formed in a stepwise shape on the upper side end portions and the lower side end portions, respectively, of each slat 31 in such a manner that the upper bracket 35 and the lower bracket 36 may be fastened to each other without the connector 32 being separated.

Each connector 32 may hinge-connect two adjacent slats 31 to each other. A connector 32 is arranged on the upper end portion of a slat 31 and a shaft 33 passes through the slat 31 and the through hole (not shown) of the connector 32, thereby rotatably connecting the slat 31 to the connector 32. An adjacent slat 31 may be connected in a similar manner to the connector 32 to join the two slats 31. The upper end portions of the adjacent slats 31 may be connected to each other by the connector 32 in opposite directions, and the lower end portions of the adjacent slats 31 may be connected to each other by another connector 32 in opposite directions. The connectors 32 thus may rotatably connect the adjacent two slats 31 to each other.

For airtightness, sealant or seals may be applied to portions of the slats 31 that are connected by the connector 32.

The upper brackets 35 and the lower brackets 36 may be arranged on lateral surfaces of the cover unit 30. The upper brackets 35 may serve to connect the upper portions of the adjacent slats 31 of the cover unit 30, and the lower brackets 36 may serve to connect the lower portions of the adjacent slats 31. However, when the cover unit 30 is unfolded or folded, the upper brackets 35 and the lower brackets 36 may serve to guide movement of the cover unit 30 along a predetermined track.

When the cover unit 30 is folded, the respective upper brackets 35 and the respective lower brackets 36 may be arranged to become in close contact with each other while connecting the respective upper and lower end portions of the slats 31 to each other. When the cover unit 30 is unfolded, the upper brackets 35 and the lower brackets 36 may be arranged to become in alternatingly close contact with each other, lying generally in a plane.

When the cover unit 30 is folded, the upper brackets 35 may connect the upper end portions of the slats 31 to each other. When the cover unit 30 is unfolded, the lower brackets 36 may connect the lower end portions of the slats 31 to each other.

An upper moving block 35*b* and a lower moving or sliding block 36*b* may be formed on the upper bracket 35 and the lower bracket 36, respectively. The upper moving block 35*b* and the lower moving block 36*b* may be inserted into slots in the main rail 11 and the guide rail 12 and guide the movement of the cover unit 30. The upper moving block 35*b* may be connected to the upper bracket 35 through an upper guide or boss 35*a*. Likewise, the lower moving block 36*b* may be connected to the lower bracket 36 through a lower guide or boss 36*a*.

Two slats 31, positioned the closest to the front end of the vehicle 1, of the cover unit 30 may be connected to each other with a start bracket 37 instead of the upper bracket 35. Thus, these brackets 37 may not include a moving block 35*b* or guide 35*a*. The frontmost two slats 31 may be set not to be restricted by the guide rail 12 when the cover unit 30 is folded or unfolded. As a result, the front portion of the cover unit 30 may have a higher degree of freedom.

A fixation bracket 34 may be hinge-connected to a lower end portion of the frontmost slat 31 of the cover unit 30. The fixation bracket 34 may be fixed to the main rail 11 or fixed to a housing 41 described below, thereby fixing a front end portion of the cover unit 30. The fixation bracket 34, and the lower end portion, positioned close to the front end of the loading bay 10 of the vehicle 1, of the slat 31 may be hinge-connected to each other in such a manner that the slat 31 is rotated.

Accordingly, a rear end of the cover unit 30 may be moved along the lengthwise direction of the vehicle 1 in a state where the front end of the cover unit 30 is not moved along the lengthwise direction of the vehicle 1. As a result, the cover unit 30 may be unfolded or folded by moving the rear end of the cover unit 30.

The main rail 11 may be formed, disposed, or installed on the loading bay 10 along the direction in which the cover unit 30 is unfolded. Since the cover unit 30 is unfolded or folded along the lengthwise direction of the vehicle 1, the main rail 11 may be formed or disposed in the lengthwise direction of the vehicle 1. A pair of the main rails 11 may be provided. The main rails 11 in a pair may be installed in such a manner as to face each other across a width of the loading bay 10. The main rails 11 may guide the lower end portion of the slats 31 of the cover unit 30 and guide the upper end portion of the slats 31 in one section.

A guide rail 12 may branch off from each respective main rail 11. The guide rail 12 may cause the upper end portion of the slats 31 to rise from the main rail 11, thereby folding the cover unit 30.

Figure 10:
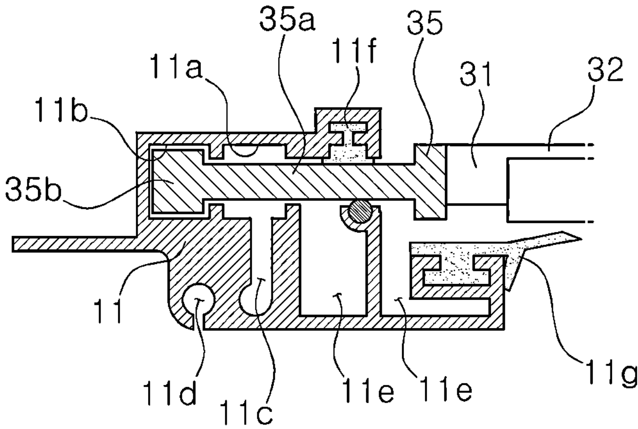
FIG. 10 is a cross-sectional view illustrating a lower bracket connected to a guide rail in a vehicular folding-type loading bay cover according to the present disclosure.
Figure 11:
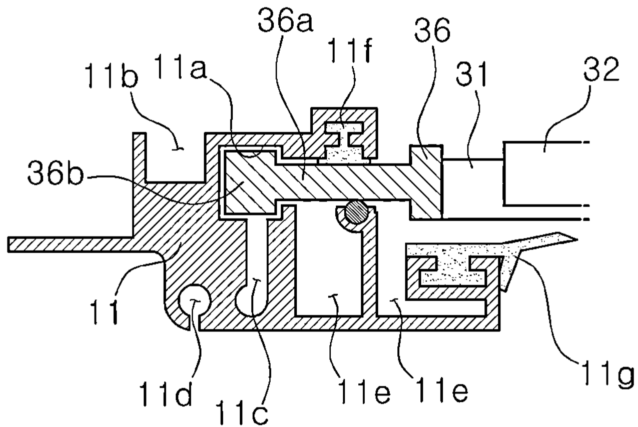
FIG. 11 is a cross-sectional view illustrating a portion of a vehicular folding-type loading bay cover according to the present disclosure, where a guide rail branches off from a main rail.
Figure 12:
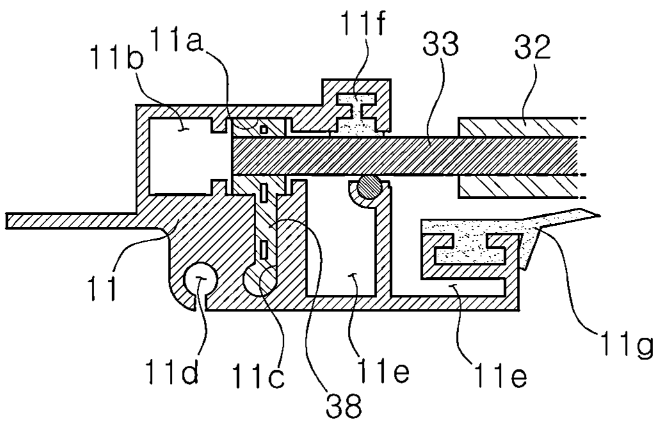
FIG. 12 is a cross-sectional view illustrating a cable plate connected to a guide rail in a vehicular folding-type loading bay cover according to the present disclosure.
Figure 13:
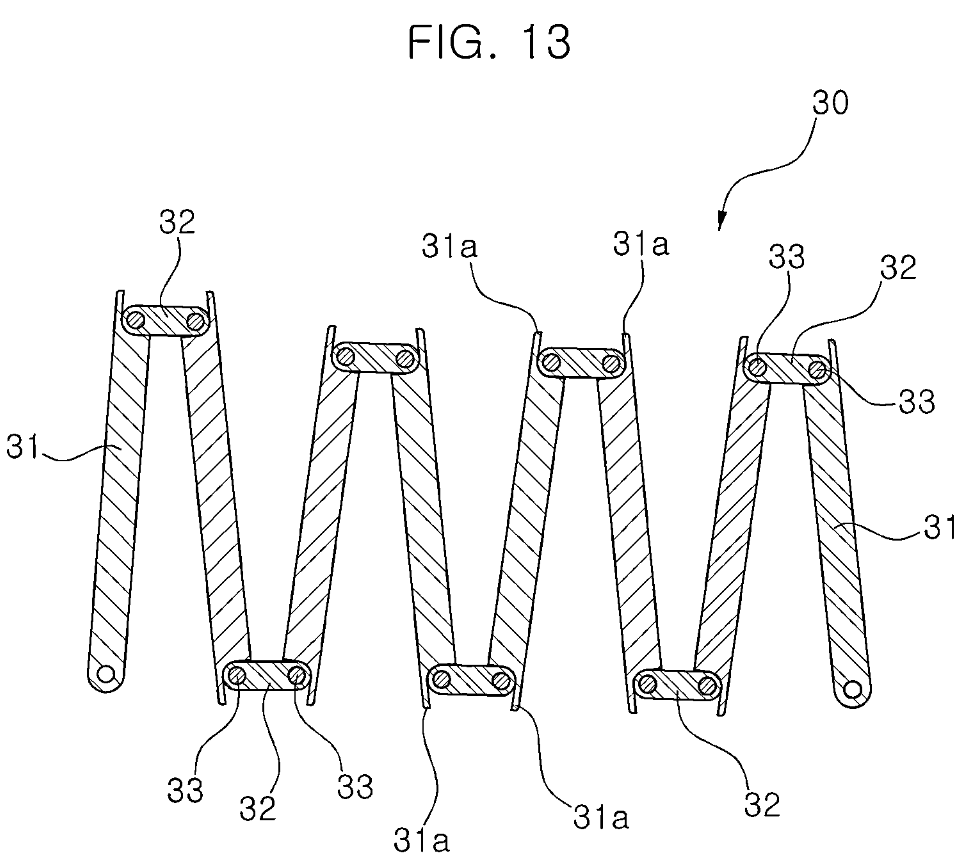
FIG. 13 is a side view illustrating slats of a cover unit connected to each other through connectors and folded in a vehicular folding-type loading bay cover according to the present disclosure.
Figure 14:
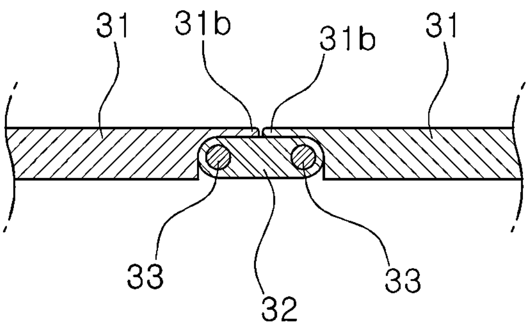
FIG. 14 is an enlarged side view illustrating a portion of the cover unit of FIG. 13 in an unfolded state in a vehicular folding-type loading bay cover according to the present disclosure.

For a detailed description of its shape, each main rail 11 may be formed to have a cross section illustrated in FIGS. 10-12. In other words, an inner slot 11*a* and an outer slot 11*b* may be formed in the main rail 11. The inner slot 11*a* may guide the lower moving blocks 36*b* on the lower brackets 36. The outer slot 11*b* may be positioned more outward than the inner slot 11*a* and guide one side of the upper bracket 35. Since the inner slot 11*a* is positioned more inward than the outer slot 11*b*, the upper guides 35*a* and the lower guides 36*a* may be formed in such a manner that the upper guides 35*a* have a greater length than the lower guides 36*a*.

The guide rails 12 may guide the movement of the cover unit 30 in such a manner that the cover unit 30 is folded. A folding slot 12*a* may be formed in each guide rail 12. The folding slot 12*a* may guide movement of the upper brackets 35, thereby folding the cover unit 30. The folding slot 12*a* may be formed in such a manner as to branch off from the outer slot 11*b* and then to run in parallel with the corresponding main rail 11. The folding slot 12*a* may be connected to the outer slot 11*b*. The folding slot 12*a* guides the upper brackets 35 while the slats 31 of the cover unit 30 are spread. The outer slot 11*b* may be connected to the folding slot 12*a*, and thus the outer slot 11*b* and the folding slot 12*a* form a path P1 along which the upper moving blocks 35*b* are moved.

The inner slot 11*a* may be formed in the main rail 11 over the entire length of the main rail 11. The outer slot 11*b* may be formed in such a manner that the outer slot 11*b* is open in an upward direction at the portion from which the folding slot 12*a* in the guide rail 12 branches off and in such a manner that the bottom surface of the outer slot 11*b* is positioned at an elevated height. Thus, the outer slot 11*b* may be connected to the folding slot 12*a* that is formed in the guide rail 12. FIG. 10 illustrates a state where the inner slot 11*a* and the outer slot 11*b* are formed to have the same height. In a portion of the main rail 11 from which the guide rail 12 branches off, as illustrated in FIG. 11, the outer slot 11*b* may be open at the top, and the bottom of the outer slot 11*b* gradually increases in height. Accordingly, the upper brackets 35, after being moved along the outer slot 11*b*, may be directed to the folding slot 12*a*, which, together with the outer slot 11*b*, forms the path P1. The upper brackets 35 may be moved along the path P1 in the forward direction or in the reverse direction.

A cable slot 11*d* may be formed in each main rail 11. The cable slot 11*d* may accommodate a cable 45 with which the cover unit 30 is folded or unfolded. A pair of the cables 45 may be provided, and thus a pair of the cable slots 11*d* may be also formed.

Particularly, one of the pair of the cable slots 11*d* may be positioned below the inner slot 11*a*. A plate slot 11*c*, along which a cable plate 38 is slid, may be formed between the inner slot 11*a* and the one of the pair of the cable slots 11*d*. Accordingly, the inner slot 11*a*, the plate slot 11*c*, and the cable slot 11*d* may communicate with each other. The cable plate 38, which is fixed to both ends of the slats 31 of the cover unit 30 that is positioned the closest to the rear end of the vehicle 1, may be inserted into the plate slot 11*c* and serves as a path for sliding.

A drain hole 11*e* for draining moisture introduced into the main rail 11 may be formed on a lower portion of the main rail 11. Through the drain hole 11*e*, the moisture introduced into the main rail 11 may flow along the main rail 11 and may be discharged to the outside.

Seals 11*f* and 11*g* may be provided on the main rail 11. The seals 11*f* and 11*g* may block foreign material, such as moisture and dust, from being introduced from the outside into the loading bay 10.

The main rails 11 may be provided on both sides, respectively, of the loading bay 10 on the vehicle 1, and the guide rails 12 may also be provided on both sides of the loading bay 10, respectively. A portion, in which the inner slot 11*a* is formed, of the main rail 11 and a portion, in which the folding slot 12*a* is formed, of the guide rail 12 may be arranged in such a manner as to face each other.

In a state where the main rails 11 and the guide rails 12 are arranged, one side end portion of the cover unit 30 may be inserted into one main rail 11 and one guide rail 12, and the other side end portion thereof may be inserted into the other main rail 11 and the other guide rail 12.

The cover unit 30 may be manually folded or unfolded. However, for convenience in use, the cover unit 30 may be opened and closed in an electrically driven manner.

To this end, a drive motor 43, a drive gear 44 that is rotated by the drive motor 43, and a cable 45 with which the rear end of the cover unit 30 is pushed or pulled may be provided.

In order to install the drive motor 43, the drive gear 44, and the cable 45, a housing 41 may be provided, and a cover 42 may be provided to cover an upper portion of the housing 41. The housing 41 may be installed in such a manner as to be connected to a front end portion of the main rails 11. The drive motor 43 may be mounted on or in the housing 41. The drive gear 44 may be rotatably installed in the housing 41. A cable groove 41*a*, along which the cable 45 is moved, may be formed in the housing 41. The cable groove 41*a* may be formed to a predetermined depth into the housing 41, depending on a track along which the cable 45 is pushed or pulled. The cable groove 41*a* may be connected to the cable slots 11*d* formed in the main rails 11.

The drive motor 43 may be installed in the housing 41. When the drive motor 43 is powered, the drive motor generates a rotational force.

The drive gear 44 may be rotated by the drive motor 43. The drive gear 44 may be a spur gear. Teeth may be formed on a circumferential surface of the drive gear 44.

An outer surface of the cable 45 may be engaged with the drive gear 44. The cable 45 may be slid by rotation of the drive gear 44, thereby pushing or pulling an end portion of the cover unit 30. As a result, the cover unit 30 may be unfolded or folded. An outer circumferential surface of the cable 45 may be threaded, or teeth may be formed on the outer circumferential surface of the cable 45 in a lengthwise direction thereof. Thus, the threaded outer circumferential surface or the teeth may be engaged with the drive gear 44. The cable 45 may be formed to have flexibility in a manner that is bendable according to a shape of the cable slots 11*d*. Additionally, the cable 45 may be formed to have a suitable level of stiffness to push the cable plate 38.

One side of the cable 45 may be engaged with the drive gear 44. The other side thereof may be connected to the cable plate 38 connected to the slats 31 of the cover unit 30. The slats 31 thereof may be positioned to be maximally spaced apart from the drive motor 43.

Figure 15:
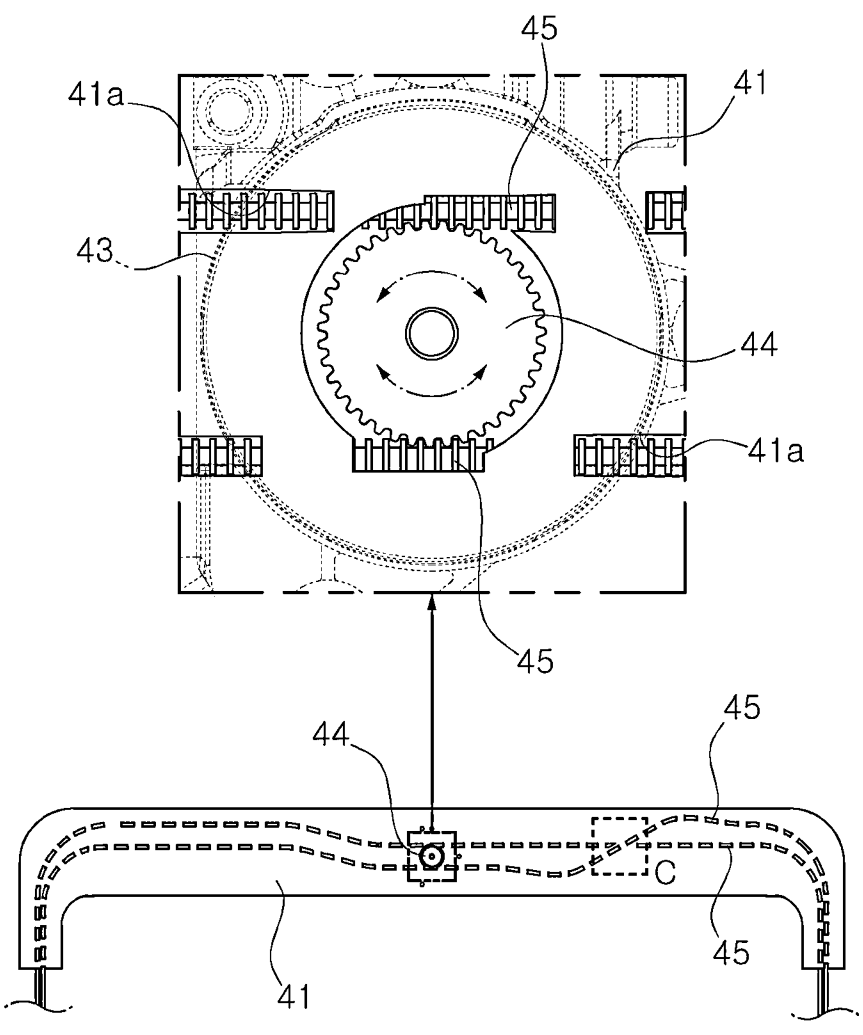
FIG. 15 is a side view illustrating a state a cable installed in a housing in a vehicular folding-type loading bay cover according to the present disclosure.

A pair of the cables 45 may be provided and the cables 45 may be connected to the cable plates 38, respectively, that are connected to the both ends of the slats 31. The cables 45 in a pair may intersect each other inside the housing 41 (refer to the portion C indicated by a dashed square in FIG. 15). The reason for this is to connect the cable(s) 45 to the cable plates 38 in the cable slots 11*d* positioned in an inner surface of the main rails 11.

Operation of the vehicular folding-type loading bay cover according to the present disclosure that has the configuration as described above is described as follows.

Figure 16:
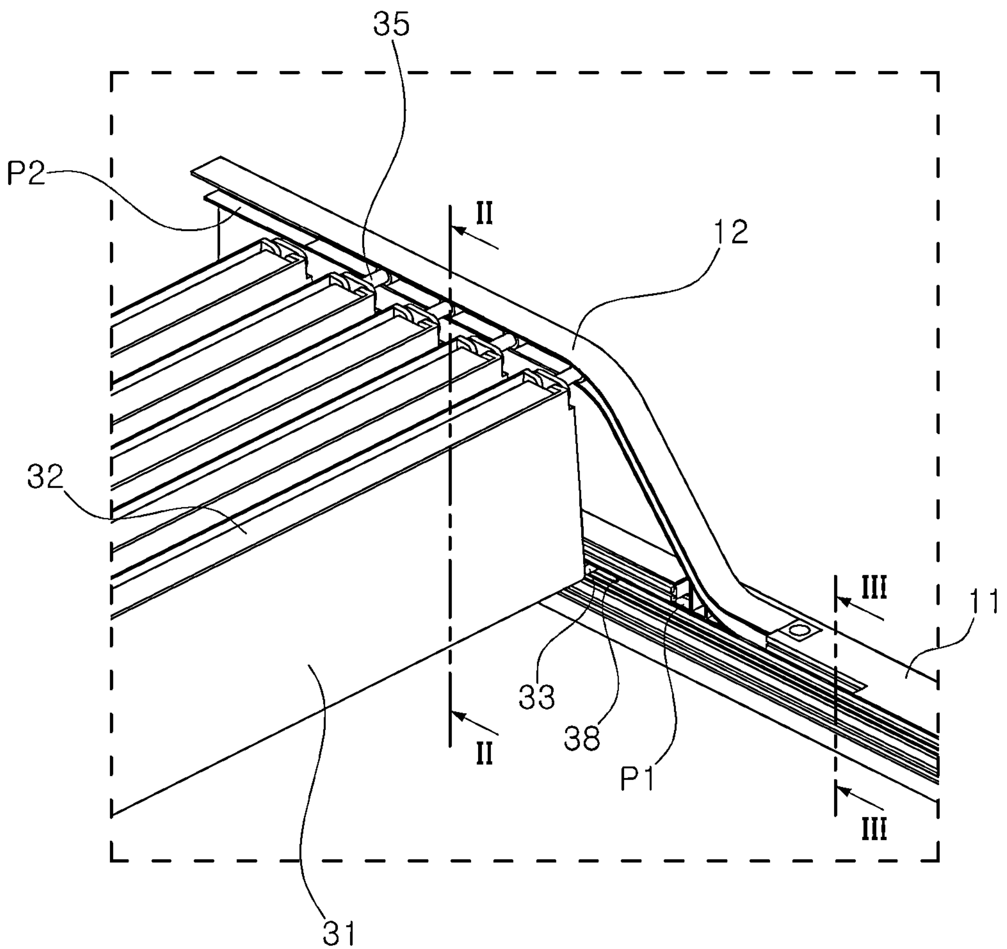
FIG. 16 is a perspective view of constituent elements of a vehicular folding-type loading bay cover according to the present disclosure and illustrating a state where the folded cover unit is accommodated.
Figure 17:
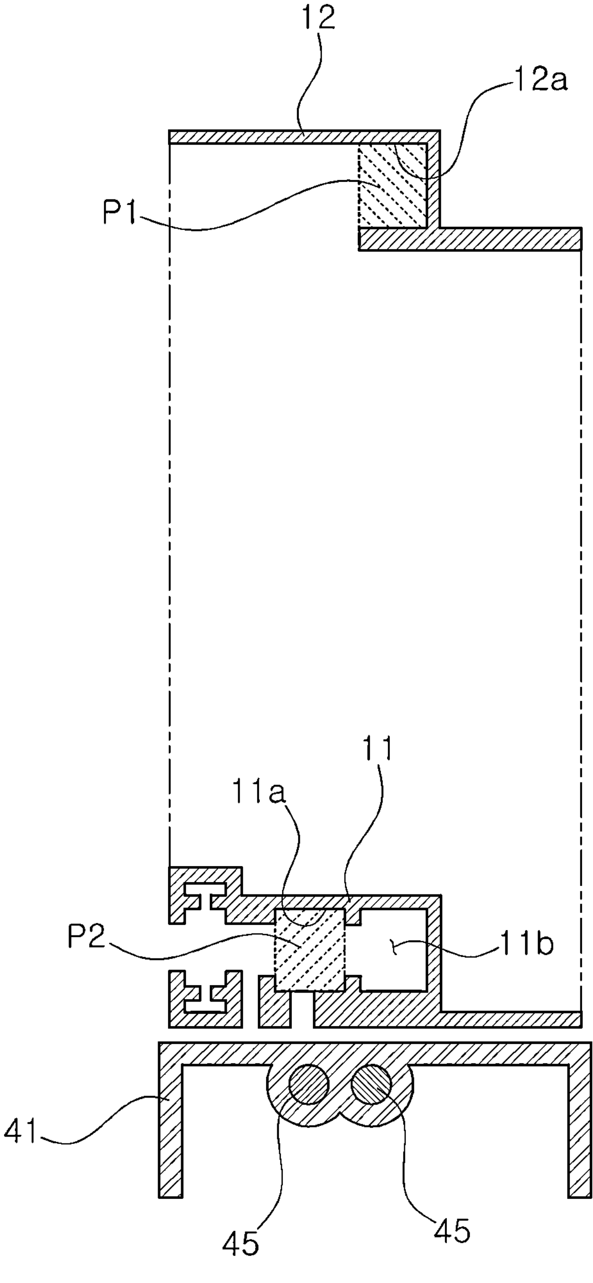
FIG. 17 is a cross-sectional view taken along line II-II of the loading bay cover of FIG. 16.
Figure 18:
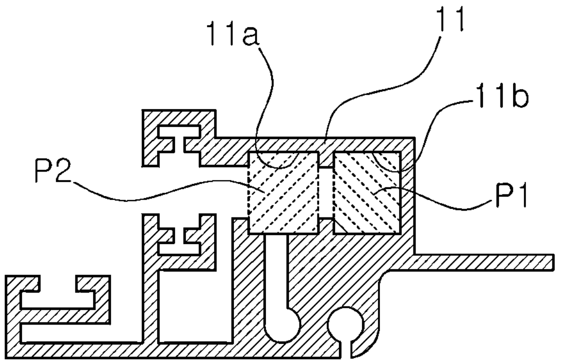
FIG. 18 is a cross-sectional view taken along line III-III of the loading bay cover of FIG. 16.

FIG. 16 is a perspective view illustrating a state where the cover unit 30 is folded. A cross section taken along line II-II of FIG. 16 shows that the folding slot 12*a* in the guide rails 12 may form a path P1 through which the upper brackets 35 pass (refer to FIG. 17). In FIG. 16, the cross section taken along line III-III shows that the outer slot 11*b* in the main rails 11 may form the path P1 through which the upper brackets 35 pass. The slots 11*a* in the main rails 11 may form a path P2 through which the lower brackets 36 passes. When the upper brackets 35 are moved from the folding slot 12*a* to the outer slot 11*b*, the cover unit 30 may be unfolded to the generally planar condition parallel with the loading bay 10 top surface or opening. When the upper brackets 35 are moved from the outer slots 11*b* to the folding slots 12*a*, the cover unit 30 may be folded, and thus may be accommodated along a section in which the guide rails 12 are formed.

Figure 19:
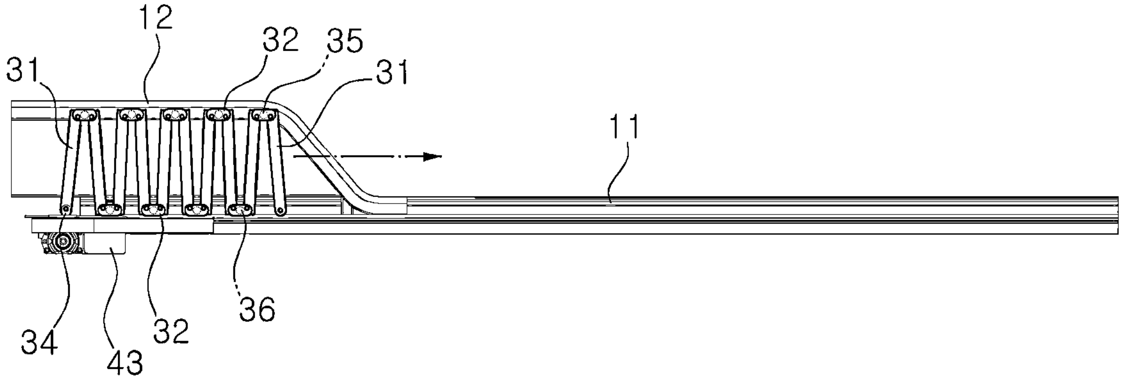
FIGS. 19-21 are side views sequentially illustrating steps where a cover unit is unfolded in a vehicular folding-type loading bay cover according to the present disclosure.
Figure 20:
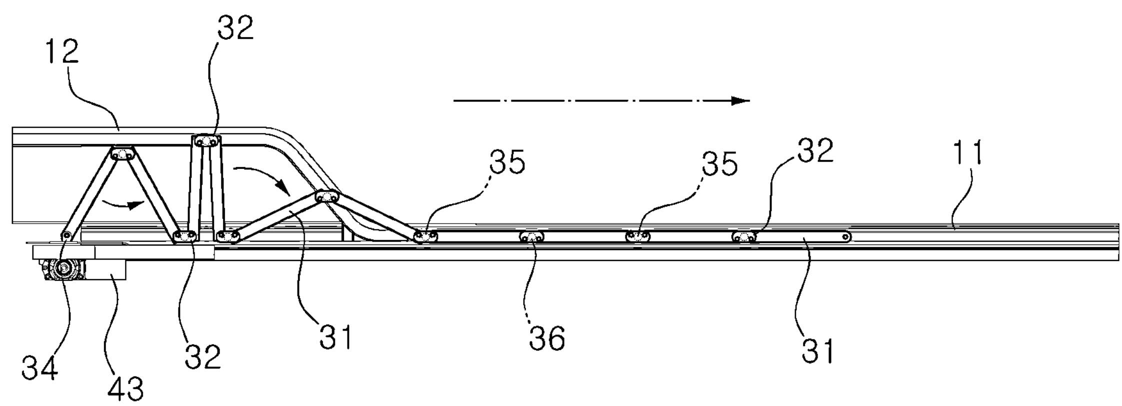
Figure 21:
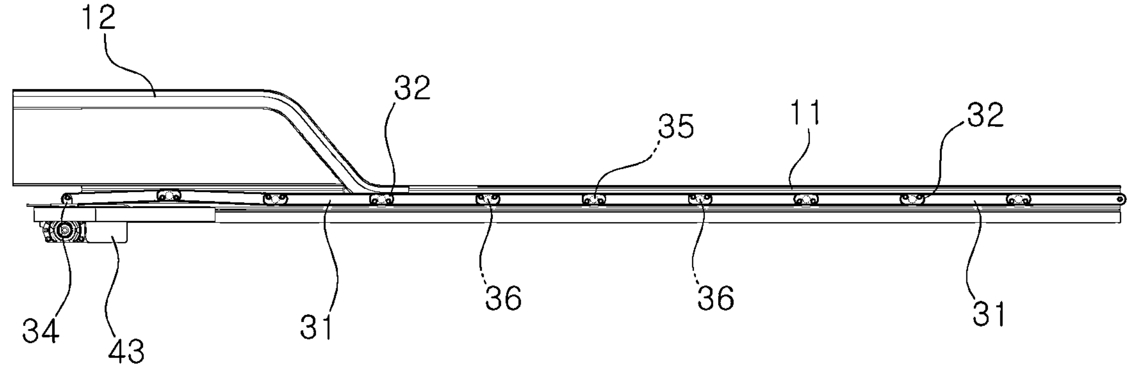

FIGS. 19-21 illustrate a process in which the cover unit 30 in a folded state is unfolded.

In the cover unit 30 in the folded state (refer to FIG. 19), a user may operate the drive motor 43 by operating a switch or the like.

When the drive motor 43 operates, the other or distant ends of the cables 45 may start to be moved toward the rear of the vehicle 1. When the other ends of the cable(s) 45 are moved toward the rear end of the vehicle 1, with the cable(s) 45, the cable plates 38 may be moved toward the rear end of the vehicle 1. When the cable plates 38 are to be moved toward the rear end of the vehicle 1, the cable plates 38 may be moved for the slat 31 of the cover unit 30 that is maximally spaced apart from the drive motor 43 (i.e., for the slat 31 that is the closest to the rear end of the vehicle 1) to the rear end of the vehicle 1 (refer to FIG. 20).

At this point, the lower brackets 36 may be moved toward the rear end of the vehicle 1 along the inner slots 11*a* in the main rails 11. The upper brackets 35 may be moved along the folding slot 12*a* in the guide rails 12 and may be moved toward the rear end of the vehicle 1 along the outer slots 11*b* in the main rails 11. When the path P1 for the upper brackets 35 may be changed to a path from the guide rails 12 to the main rails 11, the slats 31 may switch from a state of being generally vertically oriented to a state of being horizontal and parallel to one another and to the loading bay 10. The lower brackets 36 may be continuously moved along the main rails 11. As a result, the cover unit 30 may be kept in close contact with an upper surface of the loading bay 10.

The drive motor 43 may continue operating, and thus, with the cable(s) 45, the cable plates 38 may be continuously pushed toward the rear end of the vehicle 1. As a result, the path P1 for the upper brackets 35 of the cover unit 30 may change to a path from the guide rails 12 to the main rails 11, thereby sequentially spreading the slats 31 horizontally.

When the cable(s) 45 are maximally moved to the rear end of the vehicle 1, as illustrated in FIG. 21, all the slats 31 of the cover unit 30 may be in a generally planar state of being in parallel with the loading bay 10, and thus may keep the loading bay 10 airtight.

Figures 22, 23:
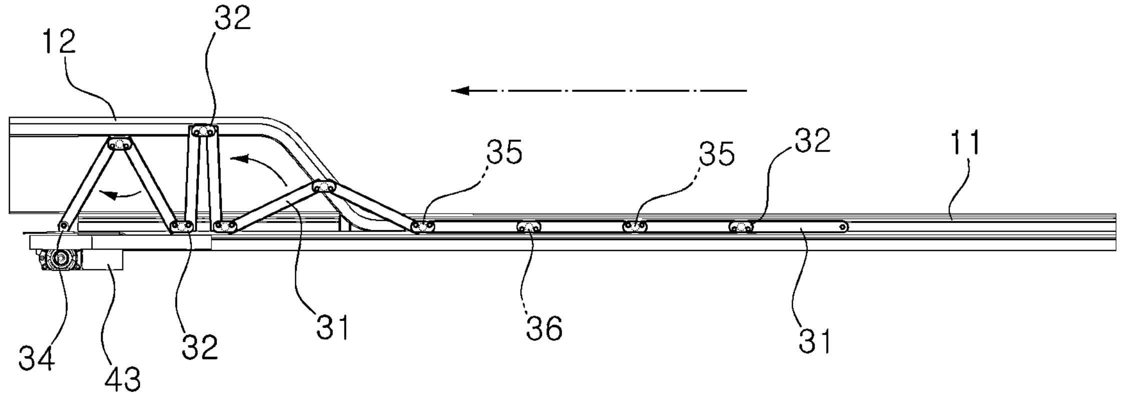
FIGS. 22-24 are side views sequentially illustrating steps where the cover unit of FIGS. 19-22 is folded in a vehicular folding-type loading bay cover according to the present disclosure.
Figure 24:
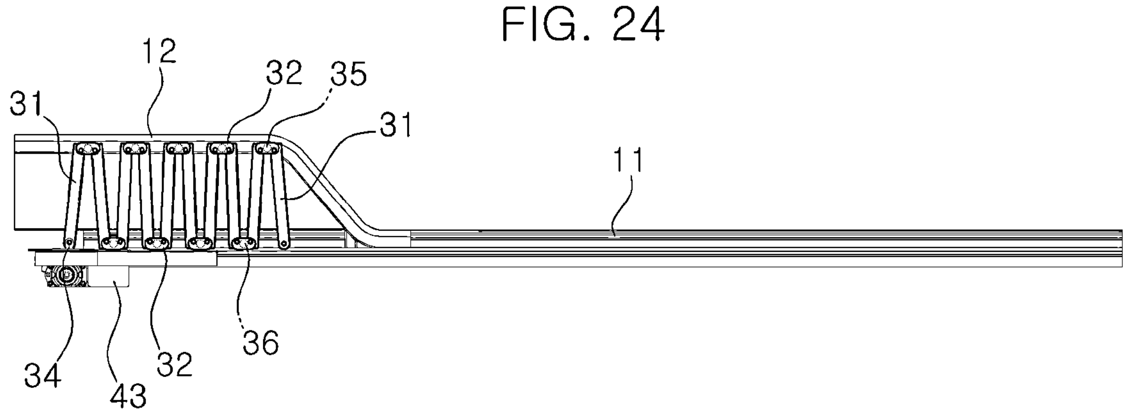

FIGS. 22-24 illustrate a process in which the cover unit 30 in an unfolded state is folded.

In a state where the cover unit 30 is unfolded and thus the vehicular loading bay 10 is closed or covered (refer to FIG. 22), the user operates the drive motor 43 by the switch or the like. At this time, the drive motor 43 may be rotated in the opposite direction to the direction in which it is rotated when the cover unit 30 is unfolded.

In order to fold the cover unit 30, when the drive motor 43 is rotated, the cable(s) 45 may be pulled toward the drive gear 44.

When the cable(s) 45 are pulled, the cable(s) 45 may pull the cable plates 38.

When the cable plates 38 are pulled, the cover unit 30 may start to be folded. At this time, the slats 31 positioned toward the rear end of the vehicle 1 may not be folded because the upper brackets 35 and the lower brackets 36 thereof may be all positioned on the main rails 11. The slats 31 of the cover unit 30 that are positioned toward the front end of the vehicle 1 may start to be folded (refer to FIG. 23). The frontmost two slats 31 of the cover unit 30 may be connected to each other with a start brackets 37. The front end portion of the cover unit 30 may be fixed with the fixation brackets 34 and thus may be folded first. Thereafter, when the cable plates 38 are further pulled with the cable(s) 45, the upper brackets 35 and the lower brackets 36 may be moved toward the front end of the vehicle 1, the upper brackets 35 change to a path from the outer slots 11*b* in the main rail s11 to the folding slots 12*a* in the guide rails 12. The lower brackets 36 may be continuously moved along the inner slots 11*a* in the main rails 11. When the upper brackets 35 in the cover unit 30 change to a path to the folding slot s12*a* in the guide rails 12, the slats 31 that constitute a front portion of the cover unit 30 may sequentially overlap.

Thereafter, when the cable(s) 45 ares maximally pulled, all the slats 31 of the cover unit 30 become in the folded state and may be accommodated into a section where the guide rails 12 are positioned (refer to FIG. 24).

While folded or unfolded, the cover unit 30 occupies less space in the loading bay 10. Because of this, the load space in the loading bay 10 may also be all utilized even in the state where the cover unit 30 is folded.

Moreover, when a mid-gate 20 positioned between a passenger compartment and the loading bay 10 is open, a height h from a bottom surface of the loading bay 10 to the cover unit 30 may be increased, and thus open space may be sufficiently utilized.

While several embodiments of the present disclosure have been described with reference to the accompanying drawings, those of ordinary skill in the art should understand that the present disclosure may be carried out in various other specific forms without departing from the inventive concept of the present disclosure and without changing the technical spirit or an essential feature of the present disclosure. Therefore, it should be understood that the above-described embodiments are illustrative in all aspects and do not limit the present disclosure.

What is claimed is:

1. A loading bay cover for a vehicle, the loading bay cover comprising:

a cover unit including a plurality of slats, wherein respective upper end portions of preceding and following slats and respective lower end portions thereof are alternatingly connected, and wherein the plurality of slats are configured to be folded and unfolded to open or cover loading bay, respectively, of a vehicle;

a main rail in the vehicular loading bay along a direction in which the cover unit is unfolded, wherein the main rail is configured to guide the lower end portions of the plurality of slats and to guide the upper end portions of the plurality of slats in a section where some of the plurality of slats are fully unfolded; and a guide rail branching off from the main rail, wherein the guide rail is generally parallel with the main rail in a section where the cover unit is fully folded and guides the upper end portions of the plurality of slats when the cover unit is folded.

2. The loading bay cover of claim 1, wherein the lower end portion of a slat of the plurality of slats that is positioned close to a front end of the loading bay is hinge-connected to a fixation bracket fixedly installed on the loading bay.

3. The loading bay cover of claim 1, wherein the upper end portions of innermost two slats of the plurality of slats are connected to each other with a start bracket that is separated from the main rail or the guide rail.

4. The loading bay cover of claim 1, wherein the cover unit comprises:

the plurality of slats is oriented in a generally vertical direction when the cover unit is folded;

a connector connecting the upper end portions of adjacent slats among the plurality of slats to each other or connecting the lower end portions of adjacent slats among the plurality of slats to each other;

an upper bracket connecting the upper end portions of the adjacent slats to each other, movable from the guide rail along the main rail when the cover unit is unfolded, and movable from the main rail along the guide rail when the cover unit is folded; and a lower bracket connecting the lower end portions of the adjacent slats to each other and movable along the main rail.

5. The loading bay cover of claim 4, wherein cover portions are configured to cover the connectors when the cover unit is unfolded and are provided on the upper end portion and the lower end portion, respectively, of the plurality of slats.

6. The loading bay cover of claim 4, wherein:

an inner slot of the main rail is configured to guide one side of the lower brackets and an outer slot of the main rail positioned outward of the inner slot is configured to guide one side of the upper brackets; and a folding slot of the guide rail is connected to the outer slot and is configured to guide the upper brackets when the cover unit is folded.

7. The loading bay cover of claim 6, wherein:

an upper moving block is connected to an upper guide, is movable along the outer slot and the folding slot, and is provided on the upper bracket; and a lower moving block is connected to a lower guide, is movable along the inner slot, and is provided on the lower bracket.

8. The loading bay cover of claim 7, wherein the upper guide is formed to have a greater length than the lower guide.

9. The loading bay cover of claim 6, wherein a cable plate is provided at the lower end portion of an outermost slat of the plurality of slats, wherein an end portion of a cable is fixed to the cable plate, and wherein the cable operates the cover unit in a direction in which the cover unit is folded or unfolded.

10. The loading bay cover of claim 9, wherein a plate slot is provided in the main rail, and wherein the cable plate is configured to slide along the plate slot.

11. The loading bay cover of claim 10, wherein a cable slot is provided in the main rail, and wherein the cable is installed in the cable slot and is configured to fold and unfold the cover unit.

12. The loading bay cover of claim 11, wherein the inner slot, the plate slot, and the cable slot communicate with each other.

13. The loading bay cover of claim 1, further comprising:

a drive motor;

a drive gear rotatable by the drive motor; and a cable engaged with the drive gear, wherein an end portion of the cover unit is configured to be pushed or pulled with the cable when the drive gear is rotated, and wherein the cover unit configured to be unfolded or folded by pushing or pulling the slat of the plurality of slats that is positioned to be maximally spaced apart from the drive motor.

14. The loading bay cover of claim 13, wherein an outer circumferential surface of the cable is threaded, or teeth are formed on the outer circumferential surface of the cable along a lengthwise direction thereof, and wherein the drive gear is engaged with the threaded outer circumferential surface or the teeth.

15. The loading bay cover of claim 13, wherein a pair of the cables is provided, and wherein the pair of cables is connected to both side ends, respectively, of the slat positioned to be maximally spaced apart from the drive motor.

16. The loading bay cover of claim 15, wherein the pair of cables is engaged with the drive gear in such a manner as to be simultaneously wound or unwound in order to simultaneously push or pull the plurality of slats when the drive gear is rotated.

17. The loading bay cover of claim 15, wherein:

a cable plate is connected to the both side ends, respectively, of the slat positioned to be maximally spaced apart from the drive motor, and an end portion one of the pair of cables is connected to each of the cable plates.

18. The loading bay cover of claim 13, further comprising:

a housing in which the drive motor and the drive gear are installed, wherein the housing is fixed to a front end portion of the main rail, and wherein a cable slot in which the cable is installed is provided in the housing.

19. A vehicle comprising:

a loading bay having a predetermined size formed in a rear portion of the vehicle;

a loading bay cover according to claim 1 and configured to selectively cover the loading bay; and a drive unit for folding or unfolding the cover unit of the loading bay cover relative to the loading bay.

20. The vehicle of claim 19, further comprising:

a drive gear rotatable by a drive motor of the drive unit; and a pair of cables engaged with the drive gear, wherein an end portion of the cover unit is configured to be pushed or pulled with the pair of cables when the drive gear is rotated, wherein the pair of cables is connected to both side ends, respectively, of a slat of the plurality of slats positioned to be maximally spaced apart from the drive motor, and wherein the cover unit is configured to be unfolded or folded by pushing or pulling the plurality of slats through the pair of cables.

* * * * *